3,845,104
Patented Oct. 29, 1974

1

3,845,104
N-SUBSTITUTED N,N-BIS(2-FLUORO-2,2-DINITROETHYL) AMINES
William H. Gilligan, Washington, D.C., assignor to the United States of America as represented by the Secretary of the Navy
No Drawing. Filed Jan. 28, 1971, Ser. No. 110,628
Int. Cl. C07c *101/10*
U.S. Cl. 260—482 R     13 Claims

ABSTRACT OF THE DISCLOSURE

Compounds of the formula $$\left(\begin{array}{c}NO_2\\|\\F-C-CH_2\\|\\NO_2\end{array}\right)_2 NR$$

wherein R is lower alkyl, benzyl, lower alkyl substituted benzyl, —R'OR", —R'CO$_2$R" and —R'—CH—(OR")$_2$ where R' is lower alkylene and R" is lower alkyl are prepared by contacting compounds of the formula $$\left(R'''OCH_2\right)_2 NR \text{ or } R'''OCH_2-N-CH_2-C-F,$$
$$\phantom{xxxxxxxxxxxxxxxxxxxxxxxxxxx} R \quad\quad NO_2$$
$$\phantom{xxxxxxxxxxxxxxxxxxxxxxxxxxxxxxxxxx} NO_2$$

wherein R''' is lower alkyl or lower alkanoyl, with fluorodinitromethane. These compounds are useful as plasticizers as well as energetic additives in explosive compositions.

BACKGROUND OF THE INVENTION

This invention relates generally to chemical compounds and more particularly to substituted tertiary amines and to a method of preparation therefor, which find use as plasticizers and additives in explosive compositions.

In order to be considered a good plasticizer in an explosive composition, a compound must not only have the ability to act as a plasticizer but must also have a low volatility, good thermal stability and be capable of releasing a relatively large amount of energy upon detonation. The low volatility is required in order to avoid vaporization of the plasticizer after it is mixed into an explosive composition which may remain unused for a relatively long period of time. If it should evaporate to any great extent, one would lose a portion of the beneficial properties realized by using a plasticizer in such a composition. Similarly, if it is not thermally stable, the plasticizer will decompose and again one would lose part of the beneficial properties realized by using a plasticizer in explosive compositions. Finally, it is important for the plasticizer to release a relatively large amount of energy on detonation so that one can obtain maximum energy release per unit weight of explosive composition. Similarly, because of their high energy content, these compounds can be used as additives in explosive compositions in order to increase the energy yield on detonation.

Thus continuing research is conducted to find compounds which are highly energetic, have low volatility and which are thermally stable.

SUMMARY OF THE INVENTION

Accordingly, one object of this invention is to provide tertiary amine compounds.

Another object of this invention is to provide tertiary amines which can be used as plasticizers in explosive compositions.

Another object of this invention is to provide tertiary amines which have a relatively low volatility.

A further object of this invention is to provide tertiary amines which have relatively good thermal stability.

2

A still further object of this invention is to provide tertiary amines which have relatively high energy.

Another object of this invention is to provide a method for the preparation of such tertiary amines.

Accordingly, these and other objects of this invention are accomplished by providing compounds of the formula $$\left(\begin{array}{c}NO_2\\|\\F-C-CH_2\\|\\NO_2\end{array}\right)_2 NR,$$

wherein R is selected from the group consisting of lower alkyl, benzyl, lower alkyl substituted benzyl, —R'—OR", —R'CO$_2$R" and —R'—CH—(OR")$_2$ wherein R' is lower alkylene and R" is lower alkyl, which compounds are prepared by contacting $$(R'''OCH_2)_2-NR \text{ or } R'''OCH_2-N-CH_2-C-F,$$
$$\phantom{xxxxxxxxxxxxxxxxxxxxxxxxxxx} R \quad\quad NO_2$$
$$\phantom{xxxxxxxxxxxxxxxxxxxxxxxxxxxxxxxxxx} NO_2$$

wherein R''' is selected from the group consisting of lower alkyl and lower alkanoyl with fluorodinitromethane at a temperature between 50° C. and 110° C. Although all the indicated compounds of this invention behave similarly, the preferred compounds of this invention are represented by the formula $$\left(\begin{array}{c}NO_2\\|\\F-C-CH_2\\|\\NO_2\end{array}\right)_2 NR,$$

wherein R is benzyl, lower alkyl substituted benzyl, —R'OR", —R'CO$_2$R" and —R—CH—(OR")$_2$ and wherein R' is lower alkylene and R" is lower alkyl.

It is to be understood that within the meaning of this invention, the terms lower alkyl, lower alkylene and lower alkanoyl refer to functional groups which contain from 1 to 6 carbon atoms.

DESCRIPTION OF THE PREFERRED EMBODIMENT

The compounds of this invention can be prepared by one of two methods. Firstly, fluorodinitromethane can be contacted with an appropriate N,N-bis(alkoxymethyl)-N-alkylamine of the formula (R'''OCH$_2$)$_2$—NR to yield the desired product $$\left(\begin{array}{c}NO_2\\|\\F-C-CH_2\\|\\NO_2\end{array}\right)_2 NR.$$

This reaction is preferably carried out at a temperature between about 50° C. and 110° C.

Alternatively, the compounds of this invention can be prepared by contacting fluorodinitromethane with an appropriate N-(2 - fluoro-2,2-dinitroethyl)-N-alkoxymethyl-N-alkylamine of the formula $$\begin{array}{cc} R & NO_2 \\ | & | \\ R'''OCH_2NCH_2C-F. \\ & | \\ & NO_2 \end{array}$$

This reaction too is preferably carried out at a temperature between about 50° C. and 110° C.

The nature of the R'''O group in the above starting materials is not critical since its chief function is to "cap" or stabilize the N-alkoxymethylamines. It must however be a reasonably good leaving group in order for the desired reaction to occur. Suitable groups for R''' may be simple lower alkyl groups such as methyl, ethyl, propyl or lower alkanoyl groups such as acetyl, propionyl, butyryl etc. In general, the lower weight alkyl groups are preferred since the resultant alkoxymethylamines are easier to isolate and purify.

The N,N-bis(alkoxymethyl)-N-alkylamines used as starting materials are prepared by prior art methods such as by the reaction of paraformaldehyde and an alkyl alcohol with an alkylamine. Water is removed as formed either by drying agents or through azeotrope formation. In some cases, acid catalysis has proven beneficial in speeding up the reaction. The N-alkoxymethyl-N-2-fluoro-2,2-dinitroethyl-N-alkylamines are prepared in the same manner. The N-2-fluoro-2,2-dinitroethyl-N-alkylamines used as the starting materials to prepare the N-alkoxymethyl-N-2-fluoro-2,2-dinitroethyl-N-alkylamines are readily prepared by means of the conventional Mannich reaction.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

N,N-bis(2-fluoro-2,2-dinitroethyl)-N-ethoxymethylamine

A mixture of 3.92 g. (0.031 mole) of fluorodinitromethane and 2.39 g. (0.013 mole) of tris (ethoxymethyl) amine was heated at 80–82° C. for 72 hours. After cooling, the reaction mixture was taken up in methylene chloride and washed with 0.2N NaOH and then with water. After drying with anhydrous magnesium sulfate and filtering, the volatiles were removed in vacuo at 50° C. The residue weighing 4.12 g. was adsorbed on silica gel and eluted with a 1:1 solution of carbon tetrachloride and chloroform. From the collected fractions, 3.48 g. of N,N-bis(2-fluoro-2,2-dinitroethyl)-N-ethoxymethylamine were obtained.

Analysis.—Calcd. for $C_7H_{11}F_2N_5O_9$: C, 24.21; H, 3.19; F, 10.94; N, 20.18. Found: C, 24.28; H, 3.08; F, 11.06; N, 20.30.

EXAMPLE 2

N,N-bis(2-fluoro-2,2-dinitroethyl)-N-t-butylamine

Paraformaldehyde (5.10 g.) was slurried with a solution of 35.5 g. (0.17 mole) of N-(2-fluoro-2,2-dinitroethyl)-t-butylamine in 140 ml. of a 6:1 solution of benzene:ethanol. After adding 200 mg. of p-toluene sulfonic acid monohydrate, the mixture was refluxed and water azeotropically removed as formed. After the theoretical amount of water was collected, the solvents were removed at 40° C., 0.6 mm. pressure.

Fluorodinitromethane (22.0 g., 0.177 mole) was added to the crude N-ethoxymethyl-N-(2-fluoro-2,2-dinitroethyl)-t-butylamine with stirring and the reactants were heated at 80° C. for 6 hours. The N,N-bis(2-fluoro-2,2-dinitroethyl)-t-butylamine was then isolated by crystallizing from ethanol; m.p. 53–54° C.

EXAMPLE 3

Ethyl N,N-bis(2-fluoro-2,2-dinitroethyl) glycine

A solution of 4.71 g. (0.038 mole) of fluorodinitromethane and 4.16 g. (0.019 mole) of ethyl N,N-bis (ethoxymethyl) glycine in 4 ml. of absolute ethanol was heated at 80° C. for 11 days. After cooling and removal of the volatiles, the residue was recrystallized from carbon tetrachloride to give 3.18 g., m.p. 64–65° C.

EXAMPLE 4

N,N-bis(2-fluoro-2,2-dinitroethyl) aminoacetaldehyde diethyl acetal

A mixture of 7.85 g. (0.063 mole) of fluorodinitromethane and 6.23 g. (0.025 mole) of N,N-bis(ethoxymethyl) aminoacetaldehyde diethyl acetal was heated at 80° C. for 11 hours. The reaction mixture, after cooling, was taken up in methylene chloride, washed with 0.3N NaOH and dried with anhydrous magnesium sulfate. The volatiles were removed in vacuo to give N,N-bis(2-fluoro-2,2-dinitroethyl) aminoacetaldehyde diethyl acetal.

EXAMPLE 5

N,N-bis-2-fluoro-2,2-dinitroethyl) benzylamine

A mixture of N,N-bis(propoxymethyl) benzylamine (6.28 g., 0.025 mole) and 6.28 g. (0.05 mole) of fluorodinitromethane was heated at 100° C. for 19 hours. After cooling, the product spontaneously crystallized and was recrystallized from absolute ethanol to give 7.83 g., m.p. 77–79° C.

Similarly the various other compounds of this invention can be prepared merely by substituting the appropriate starting materials in the above procedures.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Compounds of the formula

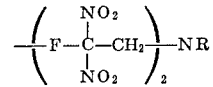

wherein R is selected from the group consisting of t-butyl, benzyl, lower alkyl substituted benzyl, —R'OR", —R'CO$_2$R" and —R'—CH—(OR")$_2$ wherein R' is lower alkylene and R" is lower alkyl.

2. Compounds of claim 1 wherein R is selected from the group consisting of t-butyl, benzyl, —R'OR", —R'CO$_2$R" and —R'—CH—(OR")$_2$ wherein R' is lower alkylene and R" is lower alkyl.

3. The compounds of claim 2 wherein R is selected from the group consisting of benzyl, —R'OR", —R'CO$_2$R" and —R'—CH—(OR")$_2$ wherein R' is lower alkylene and R" is lower alkyl.

4. The compound of claim 2 wherein R is t-butyl.

5. The compound of claim 3 wherein R is benzyl.

6. The compound of claim 3 wherein R is —R'OR".

7. The compound of claim 6 wherein R' is —CH$_2$— and R" is —CH$_2$—CH$_3$.

8. The compound of claim 3 wherein R is —R'CO$_2$R".

9. The compound of claim 8 wherein R' is —CH$_2$— and R" is —CH$_2$CH$_3$.

10. The compound of claim 3 wherein R is —R'—CH—(OR")$_2$.

11. The compound of claim 10 wherein R' is —CH$_2$— and R" is —CH$_2$CH$_3$.

12. A method of preparing compounds of the formula

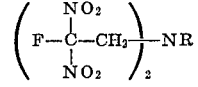

wherein R is selected from the group consisting of lower alkyl, benzyl, lower alkyl substituted benzyl, —R'OR", —R'CO$_2$R" and —R'—CH—(OR")$_2$ wherein R' is lower alkylene and R" is lower alkyl comprising contacting fluorodinitromethane with a compound of the formula (R'''OCH$_2$)$_2$NR wherein R''' is selected from the group consisting of lower alkyl and lower alkanoyl at a temperature between about 50° C. and 110° C.

13. A method of preparing compounds of the formula

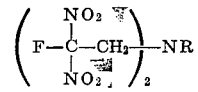

wherein R is selected from the group consisting of lower alkyl, benzyl, lower alkyl substituted benzyl, —R'OR", —R'CO$_2$R" and —R'—CH—(OR")$_2$ wherein R' is lower alkylene and R" is lower alkyl comprising contacting fluorodinitromethane with a compound of the formula

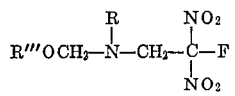

wherein R''' is selected from the group consisting of lower alkyl and lower alkanoyl at a temperature between about 50° C. and 110° C.

References Cited
UNITED STATES PATENTS

| | | | |
|---|---|---|---|
| 3,291,833 | 12/1966 | Gold et al. | 260—584 C |
| 3,316,292 | 4/1967 | Schaffler | 260—486 |
| 3,576,840 | 4/1971 | Frankel | 149—92 X |

LELAND A. SEBASTIAN, Primary Examiner

U.S. Cl. X.R.

149—92; 260—583 F, 584 C, 570.9